No. 609,521. Patented Aug. 23, 1898.
J. A. PENNINGTON.
NUT LOCK.
(Application filed Dec. 30, 1897.)

(No Model.)

Witnesses:
Richard T. Harrison
A. Kraeling

Inventor
J A Pennington
Per
O D Levis
Att'y

UNITED STATES PATENT OFFICE.

JOHN A. PENNINGTON, OF PITCAIRN, PENNSYLVANIA.

NUT-LOCK.

SPECIFICATION forming part of Letters Patent No. 609,521, dated August 23, 1898.

Application filed December 30, 1897. Serial No. 664,694. (No model.)

*To all whom it may concern:*

Be it known that I, JOHN A. PENNINGTON, a citizen of the United States, residing at Pitcairn, in the county of Allegheny and State of Pennsylvania, have invented certain new and useful Improvements in Nut-Locks; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to certain new and useful improvements in lock-nuts.

The invention has for its object the provision of a novel form of nut-locking device, and is especially useful upon the bolts for securing fish-plates to rail-joints, as well as other machine parts where the constant movement of parts is liable to cause an ordinary nut to become unscrewed.

With the above object in view the invention finally consists in the novel construction and combination of parts, as will be hereinafter more specifically described in detail.

In describing the invention in detail reference is had to the accompanying drawings, forming a part of this specification, and wherein like numerals designate like parts throughout the several views, in which—

Figure 1:
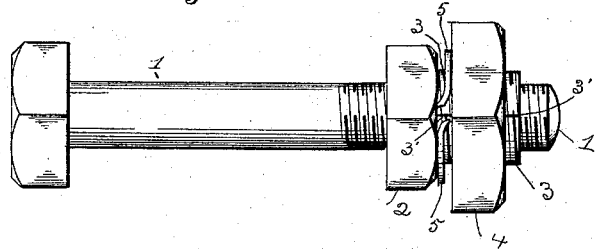
Figure 2:
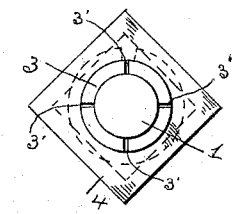
Figure 3:
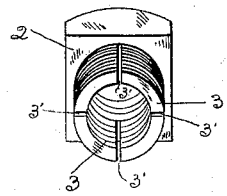
Figure 4:
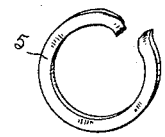

Figure 1 is a longitudinal side view of a bolt which is fitted with my improved locking-nuts. Fig. 2 is an end view of the same. Fig. 3 is a perspective view of one of the nuts removed. Fig. 4 is a perspective view of the washer.

Referring to the drawings, the numeral 1 designates an ordinary bolt, and upon the threaded end of this bolt is loosely fitted the specially-formed nut 2. This nut has formed thereon the slightly-tapered extension 3, which is split at the four points indicated as 3'. A thread is formed upon the periphery of this extension for the reception of the jam-nut 4. Between the two nuts and upon the extension is loosely fitted the split spring-washer 5, whose ends are oppositely turned and sharpened to a cutting edge, so as to engage with both nuts, as shown.

It will be readily understood that when the nut 2 is screwed up in place tightening up nut 4 upon the tapered extension causes the latter to spring down and clamp tightly upon the bolt, and at the same time the spring-washer is contracted, so that the sharp ends engage with the face portions of the nuts to such extent that the nuts could not become unscrewed very easily, as the ends of the washer would cut into the nut-faces sufficient to hold them together.

Having thus shown and described my invention, what I claim as new, and desire to secure by Letters Patent, is—

The combination with a bolt of any ordinary construction of a pair of locking-nuts, one of which has a slightly-tapered extension or sleeve formed upon one side, and which is split at various points so that it may be contracted to a smaller diameter, a jam-nut adapted to screw upon the said extension in order to contract it, and a split washer arranged between the inner faces of both nuts, and whose ends are formed to a knife-edge and oppositely turned outwardly so as to engage with the faces of the nuts and prevent them being turned in an opposite direction, substantially as shown and described.

In testimony whereof I affix my signature in presence of two witnesses.

JOHN A. PENNINGTON.

Witnesses:
L. W. MENDENHALL,
FRANK G. NEWTON.